US011619823B2

(12) United States Patent
Le et al.

(10) Patent No.: US 11,619,823 B2
(45) Date of Patent: Apr. 4, 2023

(54) OPTICAL SYSTEM FOR DISPLAYING MAGNIFIED VIRTUAL IMAGE

(71) Applicant: 3M INNOVATIVE PROPERTIES COMPANY, St. Paul, MN (US)

(72) Inventors: John D. Le, Woodbury, MN (US); Zhisheng Yun, Sammamish, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/597,591

(22) PCT Filed: Jul. 2, 2020

(86) PCT No.: PCT/IB2020/056274
§ 371 (c)(1),
(2) Date: Jan. 12, 2022

(87) PCT Pub. No.: WO2021/014245
PCT Pub. Date: Jan. 28, 2021

(65) Prior Publication Data
US 2022/0244552 A1 Aug. 4, 2022

Related U.S. Application Data

(60) Provisional application No. 62/876,814, filed on Jul. 22, 2019.

(51) Int. Cl.
*G02B 27/02* (2006.01)
*G02B 5/30* (2006.01)

(52) U.S. Cl.
CPC ......... *G02B 27/027* (2013.01); *G02B 5/3041* (2013.01); *G02B 5/3083* (2013.01)

(58) Field of Classification Search
CPC .. G02B 27/01; G02B 27/017; G02B 27/0172; G02B 27/0101; G02B 27/283;
(Continued)

(56) References Cited

U.S. PATENT DOCUMENTS 5,966,242 A 10/1999 Yamanaka
9,557,568 B1 * 1/2017 Ouderkirk .......... B29D 11/0073
(Continued)

FOREIGN PATENT DOCUMENTS

WO WO 2017-039710 3/2017
WO WO 2018-178817 10/2018

OTHER PUBLICATIONS

Frisén, "Optical and Neural Resolution in Peripheral Vision." Investigative Ophthalmology & Visual Science, Jul. 1975, vol. 14, No. 7, pp. 528-536.
(Continued)

*Primary Examiner* — Jie Lei
(74) *Attorney, Agent, or Firm* — Jonathan L. Tolstedt

(57) ABSTRACT

An optical system for displaying a magnified virtual image of an image emitted by a display to a viewer. The optical system includes first and second lenses facing each other and spaced apart by an air gap to define an optical cavity therebetween. The optical cavity includes a reflective polarizer disposed on a major surface of the first lens, and an optical stack disposed on a major surface of the second lens. The optical stack includes an absorbing polarizer, a first retarder layer, a partial reflector, and a second retarder layer disposed between the absorbing polarizer and the partial reflector. The first and/or second lenses is/are birefringent lens provided outside the optical cavity to control polarization.

9 Claims, 2 Drawing Sheets

(58) Field of Classification Search
CPC .. G02B 27/02; G02B 27/027; G02B 17/0856; G02B 25/00; G02B 5/3041; G02B 5/3083; G02B 5/3025; G02B 5/5305; G02B 7/08; G02B 7/28; G02B 7/287; G02B 2027/014; G02B 2027/017; G02B 2027/013; G02B 2027/0187; G02B 2027/0185; G02B 2027/0118; G02F 1/29; G02F 1/294; G02F 1/137; G02F 1/1335; H04N 5/64; H04N 13/344; H04N 13/398
USPC ........ 359/802, 13, 630–632, 485.01, 485.03, 359/489.15, 489.07, 489.12, 489.2; 345/4–9
See application file for complete search history.

(56) References Cited

U.S. PATENT DOCUMENTS

2011/0193814 A1     8/2011   Gay
2018/0210222 A1     7/2018   Seo

OTHER PUBLICATIONS

Geng, "Viewing Optics for Immersive Near-Eye Displays: Pupil Swim/Size and Weight/Stray Light", Digital Optics for Immersive Displays, May 2018, vol. 10676, pp. 1067606-1-1067606-17.

McCarthy, "Quantitative Evaluation of Human Visual Perception for Multiple Screens and Multiple Codecs", SMPTE Motion Imaging Journal, May/Jun. 2013, vol. 122, pp. 36-42.

Parikh, "40-1: Invited Paper: Next Generation Virtual Reality Displays: Challenges and Opportunities", SID Symposium Digest of Technical Papers, 2018, vol. 49, No. 1, pp. 502-505.

Tamron, "Production Process of a Tamron Lens", Japan by Natsume Co., Ltd., 2012, Chapter 1 and 2, pp. 1-36.

Tan, "Foveated Imaging for Near-Eye Displays", Optics Express, Sep. 2018 Vol. 26, No. 19, pp. 25076-25085.

Wong, "Folded Optics with Birefringent Reflective Polarizers", Digital Optical Technologies, Jun. 2017, vol. 10335, pp. 103350E-1-103350E-7.

International Search Report for PCT International Application No. PCT/IB2020/056274 dated Sep. 29, 2020, 3 pages.

\* cited by examiner

OPTICAL SYSTEM FOR DISPLAYING MAGNIFIED VIRTUAL IMAGE

TECHNICAL FIELD

The disclosure generally relates to optical systems, particularly optical systems having birefringent lenses, for displaying magnified virtual images.

BACKGROUND

Many displays, including virtual reality (VR) displays, attempt to present realistic images that replicate a real or imaginary environment. In some applications, VR displays attempt to provide immersive simulation of a three-dimensional environment.

SUMMARY

In some aspects of the disclosure, an optical system for displaying a magnified virtual image of an image emitted by a display to a viewer is provided. The optical system includes a first lens having opposing first and second major surfaces. The optical system further includes a second lens having opposing third and fourth major surfaces. The third and second major surfaces face each other and are spaced apart by an air gap. The second major surface is concave toward the third major surface. Each of the first and second lenses have a retardance of greater than about 25 nm at at least a first wavelength in a first wavelength range extending from about 400 nm to about 700 nm. The optical system further includes a reflective polarizer disposed on and conforming to the second major surface. The reflective polarizer substantially transmits a first polarization state and substantially reflects an orthogonal second polarization state. The optical system further includes an optical stack disposed on and conforming to the third major surface. The optical stack includes an absorbing polarizer substantially transmitting the first polarization state and substantially absorbing the second polarization state. The optical stack further includes a first retarder layer, and a partial reflector disposed between the absorbing polarizer and the first retarder layer. For at least one wavelength in the first wavelength range, the partial reflector has an optical reflectance of at least 30% and an optical transmittance of at least 30%. The optical stack further includes a second retarder layer disposed between the absorbing polarizer and the partial reflector. Each of the first and second retarder layers is substantially a quarter-wave retarder at at least one wavelength in the first wavelength range. The absorbing polarizer is disposed closer to the third major surface and the first retarder layer is disposed farther from the third major surface.

In some aspects of the disclosure, an optical system for displaying a magnified virtual image of an image emitted by a display to a viewer is provided. The optical system includes first and second lenses facing each other and spaced apart by an air gap. Each of the first and second lenses have a retardance of greater than about 25 nm at at least a first wavelength in a first wavelength range extending from about 400 nm to about 700 nm. The optical system further includes a reflective polarizer disposed on and conforming to a major surface of the first and second lenses. The reflective polarizer substantially transmits a first polarization state and substantially reflects an orthogonal second polarization state. The optical system further includes a partial reflector disposed on and conforming to a major surface of the first and second lenses. For at least one wavelength in the first wavelength range, the partial reflector has an optical reflectance of at least 30% and an optical transmittance of at least 30%. The optical system further includes first and second retarder layers disposed between a major surface of the first lens and a major surface of the second lens. The first and second retarder layers are disposed such that for each light ray that is emitted by the display and is incident on one of the first and second retarder layers at a first incident angle and is transmitted by the retarder layer with the transmitted light ray propagating toward the other one of the first and second retarder layers, at least a first portion of the transmitted light ray is incident on the other one of the first and second retarder layers at a second incident angle substantially equal to the first incident angle.

In some aspects of the disclosure, an optical system including first and second lenses is provided. Each lens has a birefringence greater than about 0.02 for at least one visible wavelength. A first major surface of the first lens and a second major surface of the second lens define an optical cavity therebetween. The optical cavity includes a reflective polarizer disposed on and conforming to the first major surface of the first lens. The reflective polarizer substantially transmits a first polarization state and substantially reflects an orthogonal second polarization state. The optical cavity further includes an optical stack disposed on and conforming to the second major surface of the second lens. The optical stack includes an absorbing polarizer substantially transmitting the first polarization state and substantially absorbing the second polarization state. The optical stack further includes a first retarder layer and a partial reflector disposed between the absorbing polarizer and the first retarder layer. For at least one wavelength in a first wavelength range extending from about 400 nm to about 700 nm, the partial reflector has an optical reflectance of at least 30% and an optical transmittance of at least 30%. The optical stack further includes a second retarder layer disposed between the absorbing polarizer and the partial reflector. Each of the first and second retarder layers is substantially a quarter-wave retarder at at least one wavelength in the first wavelength range. The absorbing polarizer is disposed closer to the second major surface and the first retarder layer is disposed farther from the second major surface.

In some aspects of the disclosure, a curved optical stack is provided. The curved optical stack includes an absorbing polarizer substantially transmitting a first polarization state and substantially absorbing an orthogonal second polarization state. The curved optical stack further includes a first retarder layer, and a partial reflector disposed between the absorbing polarizer and the first retarder layer. For at least one wavelength in a first wavelength range extending from about 400 nm to about 700 nm, the partial reflector has an optical reflectance of at least 30% and an optical transmittance of at least 30%. The curved optical stack further includes a second retarder layer disposed between the absorbing polarizer and the partial reflector. At least one of the first and second retarder layers is substantially a quarter-wave retarder at at least one wavelength in the first wavelength range. The optical stack is an integral optical stack and curved along mutually orthogonal directions.

BRIEF DESCRIPTION OF DRAWINGS

The various aspects of the disclosure will be discussed in greater detail with reference to the accompanying figures where.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Although molded plastic lenses cost less to manufacture than glass lenses, application of molded plastic in polarization optics is limited due to its birefringence. For folded optics applications, it is desired to control polarization in the folded optics cavity. The presence of a birefringent material in addition to a quarter wave plate (QWP) in folded optics cavity could complicate the polarization and compromise QWP performance and may produce more direct light leakage in the system.

Designing an optical system where birefringent lens material are provided outside the folded optics cavity may help to control polarization. In addition, designing the optical system with a QWP-half-mirror-QWP structure so that direct ray leakage travels through both QWP at the same or similar angle of incidence may help to control polarization and direct light leakage.

Figure 1:
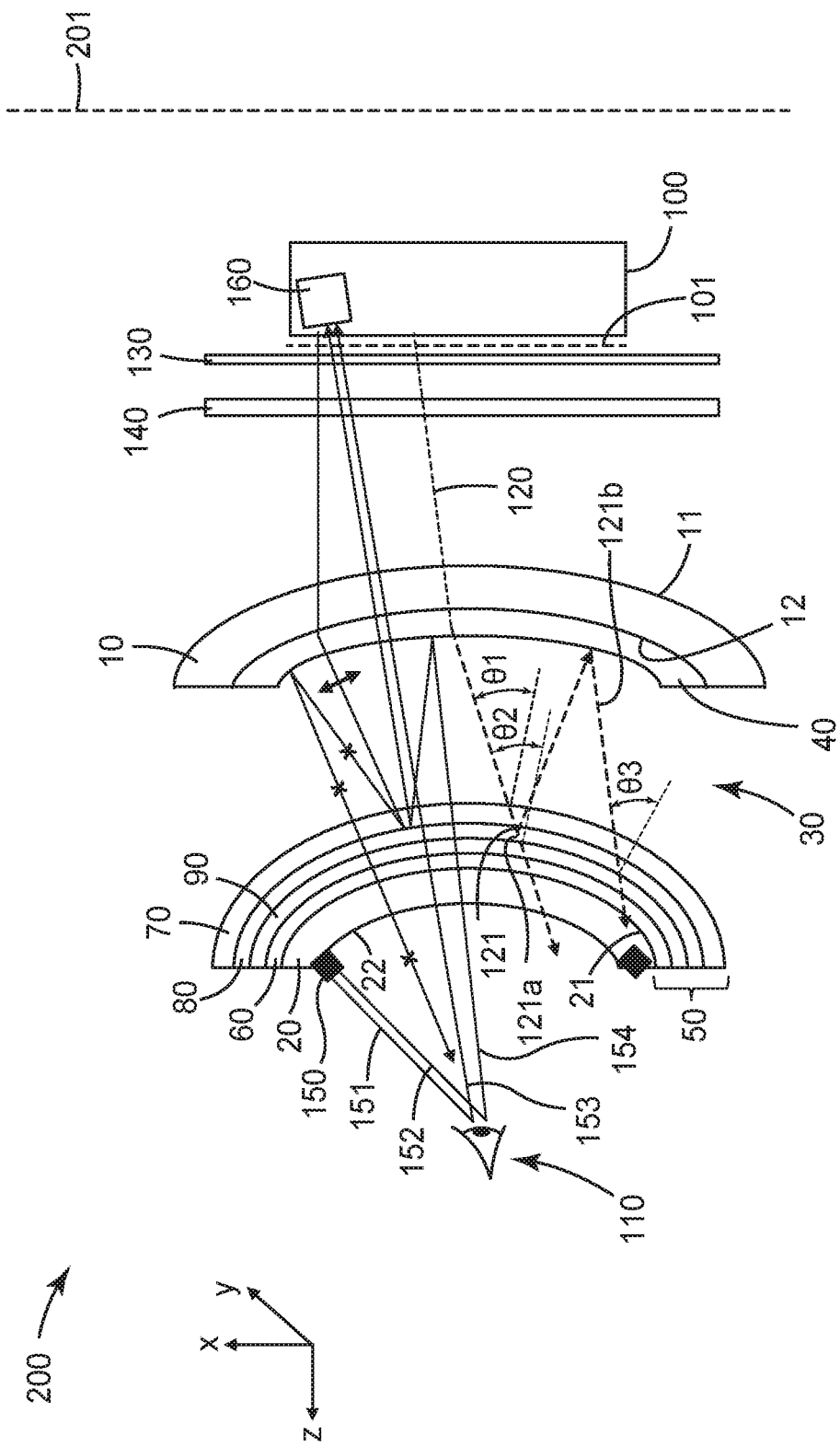
FIG. 1 is a schematic diagram illustrating an optical system according to some aspects of the disclosure.

FIG. 1 is a diagram illustrating an optical system 200 in accordance with some embodiments of the present description. Optical system 200 may be described as a folded optical system in which a light beam is bent as it traverses the system so that the optical path of the light is longer than the length of the system. Optical systems disclosed herein employ folded optics and are useful for head-mounted displays, such as virtual reality displays, cameras, such as cameras included in a cell phone, and smart watches, for example. These systems can provide an optical system having a high field of view, a high contrast, a low chromatic aberration, a low distortion, and/or a high efficiency in a compact configuration that is useful in various applications.

The optical system (200) is configured to display a magnified virtual image (201) of an image (101). The optical system, in some embodiments, includes a display (100) configured to emit an image (101), and the optical system is configured to display a magnified virtual image (201) of the emitted image for viewing by a viewer (110). The display (100) may include one or more LEDs, including in some cases one or more laser diodes. Several such LEDs can be combined to produce a desired spectral distribution of light. The display may have red, green, and blue sub-elements to provide a full color image. For example, the outputs of red, green, and blue-emitting LEDs may be combined to provide nominally white light, or white-emitting LEDs may be used instead or additionally. In some embodiments, the display (100) may be any suitable type of display including, for example, liquid crystal displays (LCDs) and organic light emitting diode (OLED) displays. The display (100) may be substantially flat or planar, or may be curved, or may include a plurality of flat or planar panels disposed at obtuse angles relative to one another. The image (101) emitted by the display (100) may be substantially polarized in some embodiments. In other embodiments, the emitted image may be substantially unpolarized.

The optical system includes a first lens (10) and a second lens (20) facing each other and spaced apart by an air gap (30). In some embodiments, the first lens (10) includes opposing first major surface (11) and second major surface (12), and the second lens (20) includes opposing third major surface (21) and fourth major surface (22). In some aspects the first through fourth major surfaces (11, 12; 21, 22) may be substantially concentric with each other. The third major surface (21) of the second lens (20) and second major surface (12) of the first lens (10) face each other and are spaced apart by the air gap (30) in some embodiments. The second major surface (12) is concave toward the third major surface (21). In some embodiments, the third major surface (21) of the second lens (20) is convex toward the second major surface (12) of the first lens (10). In some embodiments, the third major surface (21) may be substantially concentric with, and may have a smaller diameter than, the second major surface (12). Each of the first and second lenses (10, 20) has a retardance of greater than about 25 nm at at least a first wavelength in a first wavelength range.

The first wavelength range may extend from about 400 nm to about 700 nm in some embodiments. In some configurations, the first wavelength range may include a wavelength of about 550 nm. In some configurations, the first wavelength in the first wavelength range may be a blue primary color wavelength, or a green primary color wavelength, or a red primary color wavelength. In some aspects, the first wavelength range may be any wavelength range over which the optical system is designed to operate. In some aspects, at least the first wavelength includes at least one of each of a blue wavelength, a green wavelength, and a red wavelength.

In some embodiments, the retardance of each of the first and second lenses (10, 20) may be greater than about 50 nm at the at least the first wavelength. In some other embodiments, the retardance of each of the first and second lenses (10, 20) may be greater than about 100 nm at the at least the first wavelength. In still other embodiments, the retardance of each of the first and second lenses (10, 20) may be greater than about 200 nm at the at least the first wavelength. In some aspects, in the first wavelength range, at least one of the first and second lenses (10, 20) has a greater retardance at a blue wavelength than at a red wavelength.

According to some embodiments, each of the first and second lens (10, 20) has a birefringence greater than about 0.02 for at least one visible wavelength. In other embodiments, each lens may have a birefringence greater than about 0.05, or greater than about 0.075, or greater than about 0.1 for the at least one visible wavelength. In some embodiments each of the first and second lens (10, 20) may be made from a plastic which has high birefringence. In some embodiments, the first lens (10) may have a birefringence less than that of the second lens (20). In some embodiments, the first lens (10) may be made from a glass having a low birefringence and the second lens (20) may be made from a plastic which may have birefringence greater than that of the first lens (10).

The optical system includes a reflective polarizer (40) disposed on and conforming to a major surface of the first and second lenses (10, 20). In the illustrated embodiment, the reflective polarizer (40) is disposed on and conforms to the second major surface (12) of the first lens (10). In other embodiments, the reflective polarizer (40) is disposed on and conforms to a first major surface (11) of the first lens (10). The reflective polarizer (40) substantially transmits light having one of orthogonal first and second polarization states (e.g., a first polarization state with the electric field along the x-axis) and substantially reflects light having the other of the first and second polarization states (e.g., a second polarization state with the electric field along the y-axis) in the first wavelength range. In some embodiments, for a substantially normally incident light having the first wavelength, the reflective polarizer may be said to substantially transmit light having a first polarization state in the first wavelength if at least 60% of incident light having the first polarization state in the first wavelength is transmitted through the polarizer (40). In some embodiments, at least 70%, or at least 80%, of incident light having the first polarization state in the first wavelength is transmitted through the polarizer (40). In some embodiments, for a substantially normally incident light having the first wavelength, the reflective polarizer may be said to substantially reflect light having a second polarization state in the first wavelength if at least 60% of incident light having the second polarization state in the first wavelength is reflected from the reflective polarizer (40). In some embodiments, at least 70%, or at least 80%, of incident light having the second polarization state in the first wavelength is reflected from the polarizer (40).

The reflective polarizer (40) used in the optical systems of the present description may be any suitable type of reflective polarizer. The reflective polarizer may be a polymeric multilayer optical film that may be substantially uniaxially oriented as described further elsewhere. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. In some embodiments, other types of reflective polarizers (e.g., wire-grid polarizers) are used.

The optical system (200) according to some embodiments includes an optical stack (50) disposed on and conforming to the third major surface (21). In some embodiments, the optical stack may be an integral optical stack and curved along mutually orthogonal directions. The optical stack (50), in some embodiments being a curved optical stack, includes at least an absorbing polarizer (60), a first retarder layer (70), a second retarder layer (90), and a partial reflector (80). In some configurations, the absorbing polarizer (60) is disposed closer to the third major surface (21) of the second lens (20) and the first retarder layer (70) is disposed farther from the third major surface (21) of the second lens (20). In some embodiments, each of the first and second retarder layers (70, 90) is substantially a quarter-wave retarder at the at least one wavelength.

In some other embodiments, a first major surface (12) of the first lens (10) and a second major surface (21) of the second lens (20) define an optical cavity (30) therebetween. The optical cavity may be substantially filled with air in some embodiments. The optical cavity (30) includes a reflective polarizer (40) disposed on and conforming to the first major surface (12) of the first lens (10), and an optical stack (50) disposed on and conforming to the second major surface (21) of the second lens (20). The reflective polarizer (40) substantially transmits a first polarization state (x-axis) and substantially reflects an orthogonal second polarization state (y-axis). The optical stack (50) includes an absorbing polarizer, a first retarder layer (70), a partial reflector (80), and a second retarder layer (90) as explained elsewhere in the present disclosure. In some aspects, the absorbing polarizer (60) may be disposed closer to the second major surface (21) of the second lens (20) and the first retarder layer (70) may be disposed farther from the second major surface (21) of the second lens (20).

The absorbing polarizer (60) substantially transmits light having one of orthogonal first and second polarization states (e.g., a first polarization state with the electric field along the x-axis) and substantially absorbs light having the other of the first and second polarization states (e.g., a second polarization state with the electric field along the y-axis) in the first wavelength range. In some embodiments, for a substantially normally incident light having the first wavelength, the absorbing polarizer may be said to substantially transmit light having a first polarization state in the first wavelength if at least 60% of incident light having the first polarization state in the first wavelength is transmitted through the absorbing polarizer (60). In some embodiments, at least 70%, or at least 80%, of incident light having the first polarization state in the first wavelength is transmitted through the absorbing polarizer (60). In some embodiments, for a substantially normally incident light having the first wavelength, the absorbing polarizer may be said to substantially absorb light having a second polarization state in the first wavelength if at least 60% of incident light having the second polarization state in the first wavelength is absorbed by the absorbing polarizer (60). In some embodiments, at least 70%, or at least 80%, of incident light having the second polarization state in the first wavelength is absorbed by the absorbing polarizer (60).

In some embodiments, the absorbing polarizer (60) may be an iodine-doped polyvinyl alcohol (PVA) polarizer. Such polarizers include an oriented PVA layer impregnated with iodine. In other embodiments, other types of absorbing polarizers (e.g. oriented polymer polarizers impregnated with an organic dye) are used.

The partial reflector (80), in some embodiments, is disposed on, and conforms to, a major surface of the first and second lenses (10, 20). In some aspects, the partial reflector (80) may be disposed between the absorbing polarizer (60) and the first retarder layer (70). For at least one wavelength in the first wavelength range, the partial reflector has an optical reflectance of at least 30% and an optical transmittance of at least 30%.

The partial reflector (80) used in the optical systems of the present disclosure may be any suitable partial reflector. For example, the partial reflector (80) may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. The partial reflector may be a half mirror, for example.

In some embodiments, the partial reflector (80) has an average optical reflectance and an average optical transmittance at the first wavelength or in the first wavelength range that are each in a range of 20% to 80%, or each in a range of 30% to 70%, or each in a range of 40% to 60%, or each in a range of 45% to 55%. The average optical reflectance and average optical transmittance in the first wavelength range refer to the unweighted average over the predetermined wavelength range and over polarizations of the optical reflectance and optical transmittance, respectively, determined at normal incidence unless indicated otherwise.

In some embodiments, for substantially normally incident light having the first wavelength, the partial reflector has an optical reflectance of at least 30% and an optical transmittance of at least 30%, for each of the first and second polarization states. In some other embodiments, for substantially normally incident light having the first wavelength, the partial reflector has an optical reflectance of at least 40% and an optical transmittance of at least 40%, for each of the first and second polarization states. In some other embodiments, for substantially normally incident light having the first wavelength, the partial reflector has an optical reflectance of at least 30% and an optical transmittance of at least 30% for at least one wavelength in a second wavelength range extending from about 750 nm to about 1000 nm.

In some embodiments, the partial reflector (80) may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

In some configurations, the second retarder layer (90) may be disposed between the absorbing polarizer (60) and the partial reflector (80). At least one or both of the first and second retarder layers is substantially a quarter-wave retarder at at least one wavelength in the first wavelength range in some embodiments. In some aspects, at least one of the first and second retarder layers (70, 90) is substantially a quarter-wave retarder at at least one wavelength in a second wavelength range extending from about 750 nm to about 1000 nm. In some other aspects, at least one of the first and second retarder layers is not a quarter-wave retarder for wavelengths from about 420 nm to about 670 nm.

Figure 2:
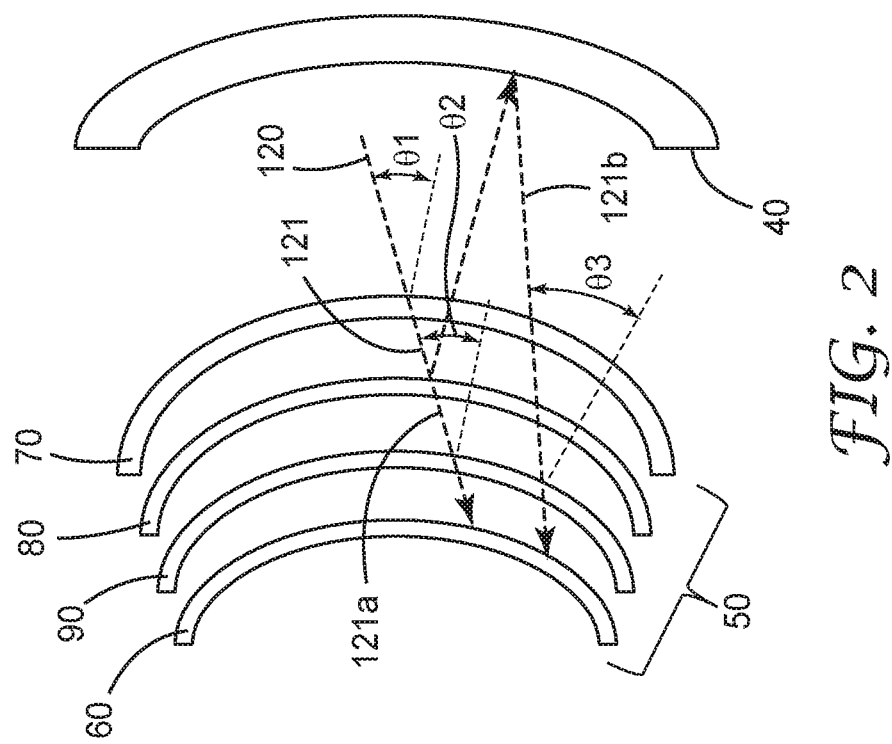
FIG. 2 is a schematic diagram of an optical system according to some embodiments.

In some embodiments, the first (70) and second (90) retarder layers are disposed between a major surface (11) of the first lens and a major surface (21) of the second lens. As best illustrated in FIG. 1 and FIG. 2, the first and second retarder layers (70, 90) are disposed such that each light ray (120) emitted by the display is incident on one (70) of the first and second retarder layers at a first incident angle (θ1). The incident light ray (120) is transmitted by the retarder layer (70) with the transmitted light ray (121) propagating toward the other one (90) of the first and second retarder layers. At least a first portion (121a) of the transmitted light ray (121) is incident on the other one (90) of the first and second retarder layers at a second incident angle (θ2) substantially equal to the first incident angle (θ1). In some aspects, the first (θ1) and second (θ2) incident angles are within 5 degrees of each other, or within 4 degrees or 3 degrees of each other. In some other aspects, the first (θ1) and second (θ2) incident angles are within 2 degrees of each other. A second portion (121b) of the transmitted light ray (121) is incident on the other one (90) of the first and second retarder layers at a third incident angle (θ3). The second portion (121b) of the transmitted light ray (121) is incident on the other one (90) of the first and second retarder layers, after being first reflected by one of the partial reflector (80) and the reflective polarizer (40), and then reflected by the other one of the partial reflector (80) and the reflective polarizer (40). The third incident angle (θ3) at which the second portion (121b) of the transmitted light ray (121) is incident on the other one (90) of the first and second retarder layers is different than the first (θ1) and second (θ2) incident angles. In some aspects, a difference between the third (θ3) and first (θ1) incident angles may be greater than about 10 degrees, or greater than about 12 degrees, or greater than about 15 degrees.

In some embodiments, for each emitted light ray (120) that is transmitted by one (70) of the first and second retarder layers toward, and is transmitted by, the other (90) one of the first and second retarder layers, one (70) of the first and second retarder layers adds a retardation to the emitted light ray and the other (90) one of the first and second retarder layers subtracts a retardation from the emitted light ray.

In some configurations, the optical system (200) includes a third retarder (130), and a second absorbing polarizer (140) may be disposed between the first lens (10) and the third retarder (130). The second absorbing polarizer (140) substantially transmits light having one of orthogonal first and second polarization states (e.g., a first polarization state with the electric field along the x-axis) and substantially absorbs light having the other of the first and second polarization states (e.g., a second polarization state with the electric field along the y-axis) in the first wavelength range. The third retarder (130) may be substantially a quarter-wave retarder at at least one wavelength in the first wavelength range extending from about 400 nm to about 700 nm.

In certain embodiments, the first, second, and third retarder layers (70, 90, 130) may be a laminated film or a thin coating. Suitable coatings for forming a quarter wave retarder include, but not restricted to, linear photopolymerizable polymer (LPP) materials and liquid crystal polymer (LCP) materials, as described in PCT Pub. No. WO 2018/178817 (Steiner et al.), for example. In some aspects, at least one of the first and second retarder layers (70, 90) may be a multilayer retarder. At least one of the first and second retarder layers may be substantially a three-quarter-wave retarder at the at least one wavelength in some embodiments.

In some aspects of the disclosure, an eye tracking system may be provided in the optical system (200). The eye tracking system includes at least one light source (150) configured to emit light (151, 152) in a second wavelength range extending from about 750 nm to about 1000 nm toward an eye of the viewer (110). In some aspects, the at least one light source (150) may be disposed on a side of a combination of the first and second lenses (10, 20). For instance, in some embodiments, the at least one light source (150) may be disposed proximate the second lens (20). The eye reflects the emitted light as reflected emitted light (153, 154) and at least one detector (160) is configured to detect the reflected emitted light (153, 154). In some aspects, the at least one detector (160) may be disposed on an opposite side of the combination of the first and second lenses (10, 20). In some embodiments, the optical system includes a display (100) configured to emit an image (101), wherein the display includes at least one detector (160) and the optical system is configured to display a magnified virtual image (201) of the emitted image for viewing by a viewer (110).

The invention claimed is:

1. An optical system for displaying a magnified virtual image of an image emitted by a display to a viewer, the optical system comprising:
   a first lens comprising opposing first and second major surfaces and;
   a second lens comprising opposing third and fourth major surfaces, the third and second major surfaces facing each other and spaced apart by an air gap, the second major surface concave toward the third major surface, each of the first and second lenses having a retardance of greater than about 25 nm at at least a first wavelength in a first wavelength range extending from about 400 nm to about 700 nm;
   a reflective polarizer disposed on and conforming to the second major surface, the reflective polarizer substantially transmitting a light beam incident on the reflective polarizer and having a first polarization state and substantially reflecting a light beam incident on the reflective polarizer and having an orthogonal second polarization state; and an optical stack disposed on and conforming to the third major surface, the optical stack comprising:
an absorbing polarizer substantially transmitting a light beam incident on the absorbing polarizer and having the first polarization state and substantially absorbing a light beam incident on the absorbing polarizer and having the second polarization state;
a first retarder layer;
a partial reflector disposed between the absorbing polarizer and the first retarder layer, for at least one wavelength in the first wavelength range, the partial reflector having an optical reflectance of at least 30% and an optical transmittance of at least 30%; and
a second retarder layer disposed between the absorbing polarizer and the partial reflector, each of the first and second retarder layers being substantially a quarter-wave retarder at at least one wavelength in the first wavelength range, wherein the absorbing polarizer is disposed closer to the third major surface and the first retarder layer is disposed farther from the third major surface.

2. The optical system of claim 1, wherein the third major surface is convex toward the second major surface, wherein the retardance of each of the first and second lenses is greater than about 100 nm at the at least the first wavelength, wherein in the first wavelength range, at least one of the first and second lenses has a greater retardance at a blue wavelength than at a red wavelength, and wherein for substantially normally incident light having the first wavelength, the reflective polarizer transmits at least 60% of the incident light having the first polarization state and reflects at least 60% of the incident light having the second polarization state.

3. The optical system of claim 1, wherein for substantially normally incident light having the first wavelength, the reflective polarizer transmits at least 80% of the incident light having the first polarization state and reflects at least 80% of the incident light having the second polarization state, and the absorbing polarizer transmits at least 80% of the incident light having the first polarization state and absorbs at least 80% of the incident light having the second polarization state, and wherein the third major surface is substantially concentric with, and has a smaller diameter than, the second major surface.

4. The optical system of claim 1, wherein the first through fourth major surfaces are substantially concentric with each other, wherein for substantially normally incident light having the first wavelength, the partial reflector has an optical reflectance of at least 40% and an optical transmittance of at least 40%, for each of the first and second polarization states, wherein for substantially normally incident light having the first wavelength, the partial reflector has an optical reflectance of at least 30% and an optical transmittance of at least 30% for at least one wavelength in a second wavelength range extending from about 750 nm to about 1000 nm, and wherein at least one of the first and second retarder layers is substantially a quarter-wave retarder at at least one wavelength in a second wavelength range extending from about 750 nm to about 1000 nm.

5. The optical system of claim 1 further comprising:
a third retarder being substantially a quarter-wave retarder at at least one wavelength in the first wavelength range, and a second absorbing polarizer disposed between the first lens and the third retarder and substantially transmitting the first polarization state and substantially absorbing the second polarization state;
an eye tracking system comprising:
at least one light source configured to emit light in a second wavelength range extending from about 750 nm to about 1000 nm toward an eye of the viewer, the eye reflecting the emitted light as reflected emitted light; and
at least one detector configured to detect the reflected emitted light, wherein the at least one light source is disposed on a side of a combination of the first and second lenses and the at least one detector is disposed on an opposite side of the combination of the first and second lenses, wherein the at least one light source is disposed proximate the second lens; and
a display configured to emit an image, the optical system configured to display a magnified virtual image of the emitted image for viewing by a viewer, wherein the display comprises the at least one detector therein.

6. An optical system for displaying a magnified virtual image of an image emitted by a display to a viewer, the optical system comprising:
first and second lenses facing each other and spaced apart by an air gap, each of the first and second lenses having a retardance of greater than about 25 nm at at least a first wavelength in a first wavelength range extending from about 400 nm to about 700 nm;
a reflective polarizer disposed on and conforming to a major surface of the first and second lenses, the reflective polarizer substantially transmitting a first polarization state and substantially reflecting an orthogonal second polarization state;
a partial reflector disposed on and conforming to a major surface of one of the first and second lenses, for at least one wavelength in the first wavelength range, the partial reflector having an optical reflectance of at least 30% and an optical transmittance of at least 30%; and
first and second retarder layers disposed between a major surface of the first lens and a major surface of the second lens, such that for each light ray that is emitted by the display and is incident on one of the first and second retarder layers at a first incident angle and is transmitted by the retarder layer with the transmitted light ray propagating toward the other one of the first and second retarder layers, at least a first portion of the transmitted light ray is incident on the other one of the first and second retarder layers at a second incident angle substantially equal to the first incident angle.

7. The optical system of claim 6, wherein the first and second incident angles are within 5 or 2 degrees of each other, wherein a second portion of the transmitted light ray is incident on the other one of the first and second retarder layers at a third incident angle different than the first and second incident angles, wherein a difference between the third and first incident angles is greater than about 10 degrees, and wherein the second portion of the transmitted light ray is incident on the other one of the first and second retarder layers, after being first reflected by one of the partial reflector and the reflective polarizer, and then reflected by the other one of the partial reflector and the reflective polarizer.

8. The optical system of claim 6, wherein at least one of the first and second retarder layers is not a quarter-wave retarder for wavelengths from about 420 nm to about 670 nm, and wherein for each emitted light ray that is transmitted by one of the first and second retarder layers toward, and is transmitted by, the other one of the first and second retarder layers, one of the first and second retarder layers adds a retardation to the emitted light ray and the other one of the first and second retarder layers subtracts a retardation from the emitted light ray.

9. An optical system comprising first and second lenses, each lens having a birefringence greater than about 0.02 for at least one visible wavelength, a first major surface of the first lens and a second major surface of the second lens defining an optical cavity therebetween, wherein the optical cavity is substantially filled with air and comprises:
- a reflective polarizer disposed on and conforming to the first major surface of the first lens, the reflective polarizer substantially transmitting a light beam incident on the reflective polarizer and having a first polarization state and substantially reflecting a light beam incident on the reflective polarizer and having an orthogonal second polarization state; and
- an optical stack disposed on and conforming to the second major surface of the second lens, the optical stack comprising:
  - an absorbing polarizer substantially transmitting a light beam incident on the absorbing polarizer and having the first polarization state and substantially absorbing a light beam incident on the absorbing polarizer and having the second polarization state;
  - a first retarder layer;
  - a partial reflector disposed between the absorbing polarizer and the first retarder layer, for at least one wavelength in a first wavelength range extending from about 400 nm to about 700 nm, the partial reflector having an optical reflectance of at least 30% and an optical transmittance of at least 30%; and
  - a second retarder layer disposed between the absorbing polarizer and the partial reflector, each of the first and second retarder layers being substantially a quarter-wave retarder at at least one wavelength in the first wavelength range, wherein the absorbing polarizer is disposed closer to the second major surface and the first retarder layer is disposed farther from the second major surface.

* * * * *